Patented Sept. 2, 1941

2,254,321

UNITED STATES PATENT OFFICE 2,254,321

CEMENT

Seymour G. Saunders, Bloomfield Hills, and Harry Morrison, Detroit, Mich., assignors to Chrysler Corporation, Highland Park, Mich., a corporation of Delaware No Drawing. Application October 29, 1938,
Serial No. 237,664

3 Claims. (Cl. 260—755)

This invention relates to an improved composition of matter and a method of making the same.

More particularly, the invention pertains to an improved adhesive-like composition which is adapted for use in cementing together parts of an assembly and sizing, priming and coating surfaces of objects.

One of the main objects of the invention is the provision of an adhesive-like composition which tenaciously adheres to rubber and rubber-like substances as well as to numerous other materials such as wood, fiber, fabric, metal and the like.

A further object of the invention is the provision of a composition of this kind in which may be included a fairly large proportion of inexpensive forms of recovered rubber compounds and inexpensive distillation residue of mineral, animal or vegetable oils.

Additional objects of the invention are the provision of an improved method of making an adhesive composition from ingredients of this character and by which the adhesive may be produced in a homogeneous state of a sprayable consistency.

Another object of the invention is the provision of a composition of this character which has substantial resistance to softening under heat, a high initial tack and final tack and which when set is substantially insoluble.

A still further object of the invention is the provision of a stable composition of this kind which will not jell, swell or deteriorate materially upon standing and which when set does not become brittle upon aging.

We have found that the reaction product of sulphur and a fused mass of rosin, rubber and pitch comprising a distillation residue of either mineral, animal or vegetable oil, when properly dispersed in a suitable liquid vehicle, provides an adhesive, sizing or coating material which has numerous desirable characteristics and which possesses substantially all of the essential requirements of adhesives for general applications. The foregoing dispersion has a high initial tack and does not soften under heat to that extent which causes undesirable slipping of parts of an assembly secured together thereby. Any pitch derived from the distillation of oils containing triglycerides or from the distillation of petroleum oil or the pitch known as asphalt may be included in the above fused mass. The term "triglyceride pitch" as employed herein and in the claims is intended to include pitch residues derived from distillation of both vegetable and animal oils. The distillation residue of cottonseed oil, linseed oil, peanut oil, palm oil, wool fat, bone fat and cocoanut oil or the distillation residue of petroleum oils, generally known as asphalt, are examples of suitable pitches. Either blown or unblown asphalt may be employed, the blown asphalt being preferable.

A mass comprising the reaction product of sulphur and fused together pitch of the foregoing types, rosin and rubber may be readily dispersed in a liquid vehicle to produce an adhesive of homogeneous nature and of sprayable consistency. When the pitch comprises either vegetable oil, animal oil or petroleum oil distillation residues, it is preferable to employ a vehicle in which the foregoing reaction product is comparatively insoluble in order to prevent jelling or cause swelling of the cement. Volatile liquid vehicles comprising petroleum distillates derived during distillation at a range of from 100° F. to 180° F. are preferable. Any capacity of such vehicles to swell the foregoing reaction product may be substantially inhibited by adding to the vehicle suitable amounts of butyl alcohol or denatured ethyl alcohol which are dissolved by the vehicle. Jell retardants may also be incorporated in the reaction products. It is found that by mixing with the reaction product small quantities of free powdered rosin while the reaction product is at a temperature below its fusion temperature, swelling of the resulting cement upon standing for long periods of time is prevented. The jelling and swelling retarding effect of the free rosin is believed to result from the protective colloid formed thereby about the dispersed particles of reaction product. Ester gum, acetic acid, dichlorophenol or ethyl alcohol maybe used as jell retarding agents in this instance.

Cements comprising the foregoing sulphuretted fusion product of vegetable oil, animal oil or petroleum oil distillation residue, rosin and rubber have a very high resistance to softening under heat and they also have a high initial and final tack. Adhesives, suitable for many purposes in which resistance to softening at comparatively high temperatures is not essential, may be made directly from the fused mass of pitch, rosin and rubber without subjecting it to a reaction with sulphur by directly dispersing the fused mass in vehicles of the abovementioned class. Substantially the same precautions may be taken to prevent jelling and swelling of this adhesive as were outlined in the description of the adhesive comprising the sulphuretted fused product. Powdered free rosin may be incorporated in the fused mass after the latter has cooled to a temperature below the fusion temperature thereof, jell retarding agents may be introduced into the vehicle for dispersion therein of the fused mass or both of these swelling and jelling retarding precautions may be taken.

For the purpose of illustration, the following specific example is recited in order to illustrate suitable proportions of the ingredients embodied in the improved composition, it being understood that various changes in the exact proportions of the quantities of the materials may be made.

Cottonseed oil pitch, asphalt or any of the foregoing pitches may be incorporated with rosin (colophony) in substantially equal quantities by weight. This step of the process may comprise heating together at substantially 450° F. 37.5% by weight of stearin pitch and 37.5% by weight of rosin. These two materials are heated slowly until the temperature thereof reaches substantially 450° F. and then 25% by weight of rubber is added. The rubber preferably comprises tire scrap which is relatively inexpensive. Crude rubber or any other suitable form of rubber may be used in place of tire scrap and if crude rubber is employed a reduction in the quantity thereof may be made. After the addition of the rubber which is preferably in the form of relatively small pieces, the temperature of the batch is raised from 480° F. to 485° F. and the batch is held at this temperature during constant stirring until a homogeneous mass is obtained. All of the rubber becomes fused with the pitch and rosin in this stage of the process. This operation may take from two to three hours depending upon the rate at which the temperature of the batch is increased.

Advantages may be gained by using in the foregoing step substantially equal quantities of rosin and rosin oil, a product of dry distillation of the rosin at about 360° C. in place of the above-mentioned quantity of rosin. The rosin oil has a plasticizing action and results in the attainment in the finished product of superior initial tack and heat resistance.

The molten mass is then allowed to cool down to from 290° F. to 300° F. When this temperature has been reached, 3% to 5% by weight of powdered sulphur is added while the batch is constantly stirred and the temperature maintained substantially between 290° F. and 300° F. During this step a reaction is produced between the sulphur and the fused together stearin pitch, rosin and rubber. Prior to the reaction, the batch is relatively thin and of pourable consistency and the reaction is continued until the batch has a putty-like consistency such that it will not run off the stirring device. The reaction is, however, discontinued before the batch stiffens to such an extent that it cannot be manipulated in a dough mixing machine during dispersion. The extent to which the reaction is continued influences the nature of the adhesive in its set state, the longer the reaction is continued, the more brittle will be the set adhesive.

The resulting reaction product is transferred from the receptacle in which it was heated to a suitable dough mixer such as a Baker-Perkins mixer and to it is added 10% of its weight of powdered rosin. The powdered rosin is then thoroughly distributed and incorporated in the reaction product by a suitable mixing operation. This mixture may be dispersed in a vehicle such as petroleum distillates commercially known as Skelly B, a distillate made by the Skelly Oil Company, at a distillation range of from 146° F. to 156° F. Amsco spirits, a product of the American Mineral Spirits Company, comprising petroleum distillates of 100° F. to 180° F. range may also be used. If desired, the swelling and jelling action of the vehicle upon the reaction product may be further inhibited by adding to the vehicle 2.5% by volume of butyl alcohol and 5% by volume of denatured ethyl alcohol.

The foregoing reaction product may also be dispersed in water with the aid of a suitable emulsifying agent such as casein or triethonalamine. This dispersion may be made in a similar mixer using, for example, 5 lbs. of casein to 100 lbs. of the reaction product, water being added to reduce the reaction product to a desired consistency.

In the foregoing examples either vegetable oil distillation residue, petroleum oil distillation residue or asphalt, or animal oil distillation residue may be used as the pitch. When the requirements of the adhesives are such that resistance to softening under heat is not essential, the sulphur reaction may be omitted in the foregoing example and the fused homogeneous mass of pitch, rosin and rubber may be dispersed in the same manner as that outlined above for the dispersion of the sulphur reaction product.

Adhesives embodying the invention may be used as cements for securing together parts of an assembly. They may also be employed for priming, sizing and other coating purposes. The composition is particularly adapted for the sizing of the backs of rugs and the like and for the adhesion to metal of sound insulation padding and similar materials in automobile construction.

Although but several specific embodiments of the invention are herein shown and described, it will be understood that various changes in the materials employed and in the sequence of steps, as well as in the temperatures and periods of heating, may be made without departing from the spirit of our invention.

We claim:

1. The method of making an adhesive which is liquid and tacky in its unset state at atmospheric temperatures which comprises fusing together rubber, rosin and a pitch selected from the group of pitches consisting of asphalt and the residue from the distillation of triglyceride-containing oils at a temperature above the devulcanization and depolymerization temperature of the rubber until the resulting mass has a flowing consistency, mixing said devulcanized fused mass to a state of uniform homogeneity while at said temperature, simultaneously vulcanizing all of the constituents of said mass while they are homogeneously mixed by reacting sulphur therewith at a temperature within the vulcanizing range of rubber until said mass has a self-sustaining consistency capable of manipulation in a dough mixing machine, and dispersing said vulcanized mass in a volatile solvent.

2. The method of making an adhesive which is liquid and tacky in its unset state at atmospheric temperatures which comprises fusing together rubber, rosin and a pitch selected from the group of pitches consisting of asphalt and the residue from the distillation of triglyceride-containing oils at a temperature above the devulcanization and depolymerization temperature of the rubber until the resulting mass has a flowing consistency, mixing said devulcanized fused mass to a state of uniform homogeneity while at said temperature, simultaneously vulcanizing all of the constituents of said mass while they are homogeneously mixed by reacting sulphur therewith at at temperature within the vulcanizing range of rubber until said mass has a self-sustaining consistency capable of manipulation in a dough mixing machine, incorporating a dispersing agent selected from the group of dispersing agents consisting of caseon and triethanolamine in said sulphurized mass, and dispersing the resulting product in water.

3. A cement capable of remaining liquid in its unset state at atmospheric temperatures comprising a dispersion having a volatile vehicle as a continuous phase and a solid phase comprising the simultaneously formed vulcanization products which have self-sustaining consistency and are manipulatable in a dough mixing machine of sulphur and each of the constituents of a homogeneously mixed devulcanized and depolymerized mass including rosin, rubber and a pitch selected from the group of pitches consisting of asphalt and the residue from the distillation of triglyceride-containing oils.

SEYMOUR G. SAUNDERS.
HARRY MORRISON.

CERTIFICATE OF CORRECTION.

Patent No. 2,254,321.  September 2, 1941.

SEYMOUR G. SAUNDERS, ET AL.

It is hereby certified that error appears in the printed specification of the above numbered patent requiring correction as follows: Page 3, first column, line 9, claim 2, for "at at" read --at a--; line 14, same claim, for "caseon" read --casein--; and that the said Letters Patent should be read with this correction therein that the same may conform to the record of the case in the Patent Office.

Signed and sealed this 14th day of October, A. D. 1941.

(Seal)

Henry Van Arsdale,
Acting Commissioner of Patents.